United States Patent [19]

Zolotnitsky

[11] Patent Number: 5,648,426

[45] Date of Patent: Jul. 15, 1997

[54] COMPOSITION AND METHOD FOR IMPACT MODIFICATION OF THERMOPLASTICS

[75] Inventor: Mikhail Zolotnitsky, Jamison, Pa.

[73] Assignee: Huls America Inc., Somerset, N.J.

[21] Appl. No.: 435,176

[22] Filed: May 5, 1995

[51] Int. Cl.$^6$ ............................................. C08L 83/00
[52] U.S. Cl. ...................... 525/100; 525/106; 525/431; 525/446; 525/464; 525/478; 525/471; 525/903
[58] Field of Search ................................. 525/903, 100, 525/106, 431, 446, 464, 471, 478

[56] References Cited

U.S. PATENT DOCUMENTS

| | | |
|---|---|---|
| Re. 33,070 | 9/1989 | Arkles . |
| 4,500,688 | 2/1985 | Arkles . |
| 4,714,739 | 12/1987 | Arkles . |
| 4,831,071 | 5/1989 | Ward et al. ............................. 524/401 |
| 4,849,469 | 7/1989 | Crosby et al. ........................ 524/439 |
| 4,849,564 | 7/1989 | Shimizu et al. . |
| 4,970,263 | 11/1990 | Arkles et al. . |
| 5,393,817 | 2/1995 | Deckers et al. . |

OTHER PUBLICATIONS

B. Arkles, J. Crosby, "Polysiloxane–Thermoplastic Interpenetrating Polymer Networks," Advances in Chemistry Series: Silicon–Based Polymer Science—A Comprehensive Resource, Makaha, Oahu, Hawaii, Nov. 1987, pp. 182–199.

M. Ito, A. Yanagase, N. Yamato, M. Mori, "A New Silicone Based Impact Modifier for PVC, Engineering Resins, and Blends," 11 pages.

P.G. Pape, "Applications of silicon–based chemicals in the plastics industry," Chemspec USA 90 Symposium, Cherry Hill, NJ, Oct. 1990.

J.W. White, P.G. Pape, D.J. Romenesko, T. Imai, Y. Morita, "New Silicone Modifiers for Improved Physical Properties and Processing of Thermoplastics and Thermoset Resins," 1991, ANTEC 91, pp. 1904–1906.

*Primary Examiner*—Ralph H. Dean
*Attorney, Agent, or Firm*—Abelman, Frayne & Schwab

[57] ABSTRACT

A method and composition for improving the impact resistance of thermoplastics is disclosed. An impact resistant thermoplastic is formed by forming a silicone containing thermosetting component, compounding it with a thermoplastic to form a silicone-thermoplastic mixture, disposing a catalyst on the mixture, and activating the catalyst while compounding the mixture with a thermoplastic. The silicone containing thermosetting component includes a first silicone compound containing hydride groups and a second silicone compound containing unsaturated groups. Activating the catalyst, preferably a platinum complex, causes the thermosetting component to cure, creating a silicone-thermoplastic semi-interpenetrating polymer network having higher impact resistance than the unmodified thermoplastic.

23 Claims, 1 Drawing Sheet

COMPOSITION AND METHOD FOR IMPACT MODIFICATION OF THERMOPLASTICS

FIELD OF THE INVENTION

This invention relates to a composition and a method for improving the impact resistance of thermoplastics, and more particularly to a method of using semi-interpenetrating silicone networks for improving the impact resistance of thermoplastics.

BACKGROUND OF THE INVENTION

An interpenetrating polymer network (IPN) is a composition of two incompatible polymers which exist in networks that are formed when at least one of the polymers is synthesized or cross-linked in the presence of the other. Systems in which both polymers are cross-linked are termed true-IPNs. Systems in which only one of the polymers is cross-linked are termed semi-IPNs. Both true- and semi-IPN systems may be referred to as thermosetting polymer networks.

The behavior of thermoplastics can be modified using semi-IPNs by forming thermoplastic semi-IPN systems. In such systems, the thermosetting polymer network is formed within a thermoplastic polymer. The coexisting structures are stabilized by physical cross-links in the thermoplastic phase.

In silicone-thermoplastic semi-IPNs, available from Huls America, Inc. of Piscataway, N.J. under the trademark Rimplast®, the thermosetting network is formed by the addition of silicone oligomers. Such a system is formed as follows. First, the thermosetting component is formed by mixing a hydride- and a vinyl-functionalized silicone component. In a second step, the thermosetting component is compounded with a thermoplastic into strands in an extruder and subsequently pelletized. In a third step, the pellets are dryed and then cooled to ambient temperature. A platinum complex catalyst is sprayed on the pellets, typically with an inhibitor to prevent reaction. In the final step, the catalyst is activated causing cross-linking to occur while the pellets are injection molded or extruded into a final product. Silicon-thermoplastic semi-IPN systems are disclosed in U.S. Pat. Nos. 4,714,739 and 4,970,263. Other types of silicon-thermoplastic IPN systems are described in U.S. Pat. Nos. 4,500,688 and Re. 33,070. These references, and all other cited in this specification, are incorporated herein by reference.

Thermoplastics modified in this manner show good release characteristics, low wear and friction, increased dimensional stability and improved melt flow.

While prior art silicone-thermoplastic semi-IPN systems offer a number of advantages over the unmodified polymer, the impact strength of such modified thermoplastics may be lower than the unmodified thermoplastic. For example, the notched impact resistance of silicone-nylon 6,6 semi-IPN is about 10 percent lower than that of unmodified nylon 6,6 and the notched impact resistance of silicone-nylon 12 semi-IPN is as much as 70 percent less than unmodified nylon 12 when such modified polymers are formed according to the teachings of the prior art. See Arkles et al., "Polysiloxane-Thermoplastic Interpenetrating Polymer Networks," Adv. in Chem. Series No. 224—Silicon Based Polymer Science: A Comprehensive Resource, p. 181–199 (1990 Amer. Chem. Soc.).

While methods are known for improving the impact resistance of thermoplastic, such methods do not provide some of the other advantages of silicone-thermoplastic semi-IPNs. For example, Pape discloses that polymethylsiloxane fluids can significantly improve the Izod impact of polycarbonate. P. G. Pape, "Applications of Silicon-Based Chemicals in the Plastics Industry," CHEMSPEC USA 90 Symposium, Cherry Hill, N.J., October 1990. Such fluids, however, have a tendency to migrate, within the thermoplastic, which may affect properties of the thermoplastic. In other methods, rubber particles are grown and incorporated in thermoplastic; however, such methods are complex.

Thus, there is a need for a simple method to improve the impact resistance of thermoplastics while retaining the benefits of silicone-thermoplastic semi-IPN systems.

SUMMARY OF THE INVENTION

A method and composition for improving the impact resistance of thermoplastics is disclosed. In one embodiment, an improved impact resistant thermoplastic is provided by forming a silicone containing thermosetting component, compounding it with a thermoplastic to form a silicone-thermoplastic mixture, disposing a catalyst on the mixture, compounding the mixture with a thermoplastic and activating the catalyst. The silicone containing thermosetting component comprises a first silicone compound containing hydride groups and a second silicone compound containing unsaturated groups. Activating the catalyst, preferably a platinum complex, causes the thermosetting component to cure, creating a silicone-thermoplastic semi-interpenetrating polymer network having a significant increase in impact resistance over the unmodified thermoplastic.

DETAILED DESCRIPTION OF THE INVENTION

Figure 1:
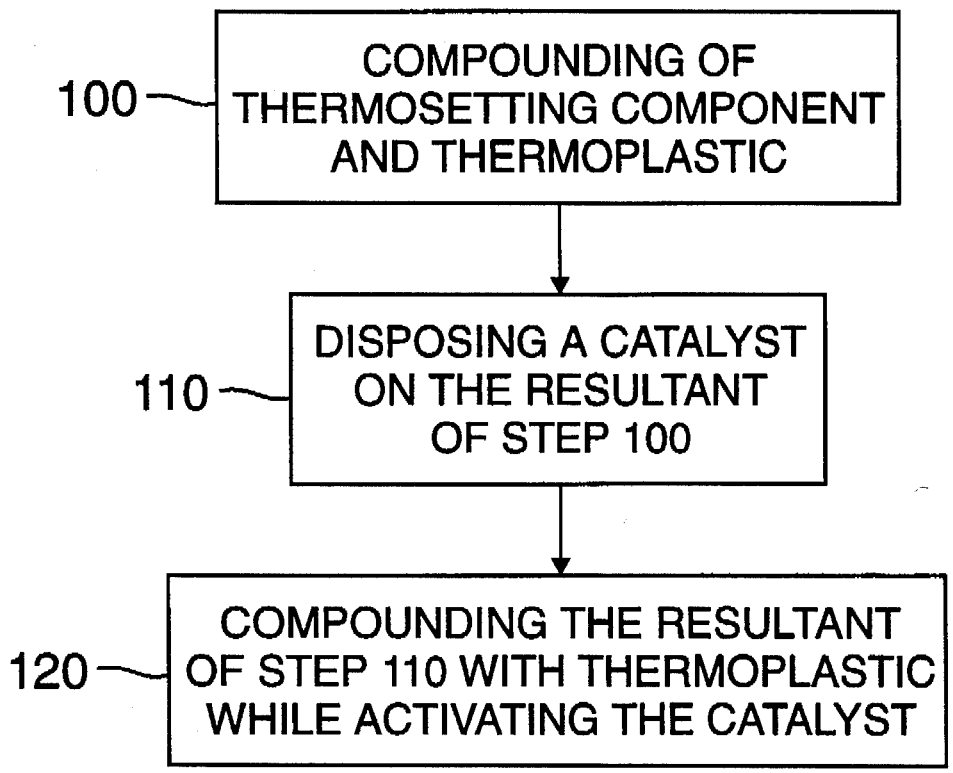
FIG. 1 is a flow chart of a process according to the present invention.

In an embodiment of a method according to the present invention, a silicone-thermoplastic semi-IPN is formed as follows. First, in step 100, two polymeric silicone components that form a thermosetting component are compounded with a thermoplastic. Alternatively, the thermosetting component may be prepared before compounding by thoroughly mixing the two polymeric silicone components.

One of the polymeric silicone components contains silicone-hydride (Si—H) groups. Suitable hydride-containing silicon components include, without limitation, hydride-containing polydimethylsiloxanes. Such components can contain other substituents such as, without limitation, phenyl groups, alkyl groups and aryl groups. Examples of suitable hydride containing silicones include, without limitation, methylhydro-dimethylsiloxane copolymer, methyldimethoxy terminated methylhydrosiloxanes and methylhydro-phenylmethylsiloxane copolymer. Hydride-containing silicone components useful for the present invention have viscosities of between about 35 and about 80,000 centistoke (ctsk), and preferably about 10,000 ctsk.

The other silicon polymeric component contains unsaturated groups, preferably vinyl, preferably in a terminal position. Most preferably, the silicon polymeric component contains two vinyl groups in terminal positions. Examples of suitable unsaturated silicones include, without limitation, vinyldimethyl terminated, vinylphenylmethyl terminated and divinylmethyl terminated polydimethylsiloxanes. Silicon polymeric components containing unsaturated groups useful for the present invention have viscosities ranging from about 500 to about 100,000 cstk.

Alternatively, both the hydride and the unsaturated group can be part of one polymeric silicone. In the presence of a catalyst, typically a platinum complex, the silicon-hydride reacts with unsaturated groups as follows:

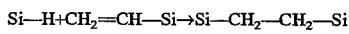

This reaction is referred to as a hydrosilylation reaction, the chemistry of which is well known.

The molar ratio of hydride- to vinyl-containing groups in the polydimethylsiloxanes, either unmodified or modified with various substituents, can vary from about 0.01 to 100 to about 100 to 0.01. In a preferred embodiment, there are a greater number of hydride groups than unsaturated groups.

Compounding means for compounding the polymeric silicon components and the thermoplastic include, without limitation, an extruder, preferably a twin-screw extruder, or a Buss Kneader® mixer. The compounded material is then normally pelletized in ways well known to those skilled in the art.

The thermoplastic can be, without limitation, polyamides such as Nylon 6, Nylon 66, Nylon 11, Nylon 12, Nylon 612, Nylon 46, Nylon 6/66, Nylon 6,10 and amorphous nylons; polyolefins such as polyethylene and polypropylene; ABS; acetal; acrylics; liquid crystal polymers, polycarbonate, thermoplastic polyesters such as PBT and PET, polyaryletherketones, polyetheretherketones, polyetherketones, polyetherimides, polysulfones, polyethersulfones, polystyrenes, SAN copolymers, various copolymers, blends and alloys of the aforementioned thermoplastics, and any rigid thermoplastic not previously mentioned. Such thermoplastics can be in a neat form or reinforced with various fillers such as clay, mica, talc, wollastonite calcium, carbonate, fiberglass or the like. The percentage of thermosetting component, i.e., the amount of the silicone components, in the thermoplastic/silicon mixture can range from about 0.1 to 99 weight percent and is preferably in the range of about 10 to 60 weight percent.

In the second step 110, the pellets of compounded thermoplastic-silicone mixture are dried and then cooled to ambient temperature. A catalyst, preferably in the form of a solution, is sprayed on the pellets. The catalyst can be any compound that can initiate the hydrosilylation reaction, such compounds being well known to those skilled in the art. Preferably, the catalyst is a platinum complex. Examples of suitable catalysts include, without limitation, dichloro-bis (triphenylphosphine)platinum, cis-dichloro-bis(acetonitrile) platinum, dicarbonyldichloroplatinum, platinum chloride and platinum oxide. Presently, the most preferred catalyst is a platinum-tetramethyl tetravinyl cyclotetrasiloxane complex.

As is known to those skilled in the art, the catalyst requirement can vary widely as a function of, among other things, the cure rate of the thermosetting compound. For example, catalyst requirements can vary from about 0.001 ppm to 1000 ppm (molar) as moles of catalyst (1 mole of catalyst providing 1 mole of platinum) per moles of unsaturated groups in the unsaturated silicon component. Inhibiting compounds, such as 3-methylisobutynyl alcohol can be added to the platinum catalyst to prevent reaction until such reaction is desired.

In a third step 120, the pellets are added to a neat thermoplastic resin and again compounded using the previously described compounding means. The pellets can be added to the neat thermoplastic resin in a range of loadings from about 0.001 to 99 weight percent, and preferably in a range of from about 0.1 to 40 weight percent. The neat thermoplastic can be different or the same as the thermoplastic with which the thermosetting compound was compounded in the second step. During compounding, the catalyst is activated, causing the vinyl addition reaction to take place. Thus, the silicone components cure and the semi-interpenetrating network forms. The catalyst is active over a broad temperature range. Typically, reaction can be initiated over the temperature range of about 80° to 350° F. (27° to 177° C.). Preferably, the reaction is initiated at the melt state of the thermoplastic. As the temperature is raised, the inhibitor, if present, is volatized. The compounded material is then cooled, pelletized and dried.

As discussed in more detail below, the aforementioned third step, hitherto unknown for the formation of silicone-thermoplastic semi-IPNs, has unexpectedly resulted in silicone-thermoplastic semi-IPNs having increased impact resistance.

The pellets are converted into final products by various methods of plastics processing, such as, without limitation, injection molding or extrusion.

The invention is further described by reference to the following specific, non-limiting example.

EXAMPLE 1

1000 grams of vinyldimethylsiloxy-terminated polydimethylsiloxane having a viscosity of 10,000 ctsk was manually mixed in a five gallon container with 1000 grams of polydimethylmethylhydrosiloxane having an average of 1 hydromethylsiloxy group per chain and a viscosity of 10,000 ctsk. A mixture of 6200 grams of AMOCO 7200P polypropylene and 1800 grams of Quantum Chemicals 6462 HR polypropylene, was also prepared.

A mixture containing 20 percent by weight of the siloxanes and 80 percent by weight of the polypropylenes was compounded in a twin-screw counterrotating ZSE-67 Leistritz extruder having a length to diameter ratio of 24 to 1. During compounding, the temperature along the barrel of the extruder ranged from about 175° C. at the inlet to about 220° C. at the outlet. The screws were rotating at 55 rpm. The strands produced from the extruder were cooled on a wet belt, chopped on a pelletizer, dried and cooled.

The pellets were then added to neat polypropylene, which was a mixture of the aforementioned polypropylenes in the aforementioned amounts. A series of different compositions, indicated below in Table 1, were prepared by varying the amount of the compounded thermoplastic-silicone pellets that were added to the neat polypropylene. A solution of platinum-tetramethyl tetravinyl cyclotetrasiloxane complex was sprayed onto the compositions. 200 wppm of catalyst was added to each composition.

The aformentioned compositions were again compounded in the aforementioned extruder, during which time the catalyst was activated. Barrel temperature ranged from about 140° to 220° C.. The screws were rotating at about 80 rpm. The resulting strands were cooled, pelletized and dried. After drying, the pellets were molded into samples in an 80 ton Van Dorn injection molding machine. The samples were conditioned, notched and tested for impact strength according to ASTM D 256. The results of testing are shown in Table 1.

TABLE 1

| Actual Silicon Content in Compounded Thermoplastic-Silicon Mixture, wt. % | Impact Strength, notched, J/m |
|---|---|
| 0.0 | 38.1 |
| 0.4 | 43.7 |
| 2.0 | 48.8 |
| 3.0 | 48.4 |
| 5.0 | 46.7 |

It should be understood that the foregoing description is illustrative of the principles of the invention and that various modifications may occur to, and be implemented by, those skilled in the art without departing from the scope and spirit of the invention. For example, as previously noted rather than individually metering the silicone components into the extruder for compounding with the thermoplastic, the silicone components can be premixed to form a thermosetting component and then compounded with the thermoplastic.

I claim:

1. A method for forming a silicone-thermoplastic semi-interpenetrating polymer network comprising:
   (a) compounding a first polymeric silicone containing silicone-hydride groups, a second polymeric silicone containing unsaturated groups, and a first thermoplastic;
   (b) disposing a catalytically effective amount of a hydrosilation catalyst on the resultant of step (a); and
   (c) compounding the resultant of step (b) with a second neat thermoplastic while activating the hydrosilation catalyst.

2. The method of claim 1 wherein the first polymeric silicone is a methylhydro-dimethylsiloxane copolymer.

3. The method of claim 2 wherein the hydride-containing silicone contains substituent groups selected from the group consisting of phenyl groups, alkyl groups, aryl groups and mixtures thereof.

4. The method of claim 3 wherein the hydride-containing silicone is selected from the group consisting of methylhydro-dimethylsiloxane copolymer trimethylsiloxy terminated, methylhydro-dimethylsiloxane copolymer methyldimethoxy terminated, and methylhydro-phenylmethylsiloxane copolymer.

5. The method of claim 1 wherein the unsaturated groups are selected from the group consisting of allyl, butenyl, and vinyl.

6. The method of claim 1 wherein the polymeric silicone containing unsaturated groups contains two vinyl groups in terminal positions.

7. The method of claim 1 wherein the polymeric silicone containing unsaturated groups is selected from the group consisting of vinyldimethyl terminated, vinylphenylmethyl terminated and divinylmethyl terminated polydimethylsiloxanes.

8. The method of claim 1 wherein the polymeric silicone containing unsaturated groups is vinyldimethylsiloxy-terminated polydimethylsiloxane.

9. The method of claim 1 wherein step (a) further comprises premixing the first polymeric silicone containing silicone-hydride groups and the second polymeric silicone containing unsaturated groups prior to compounding with the thermoplastic.

10. The method of claim 1 wherein the first and the second thermoplastic are selected from the group consisting of polyamides, polyolefins, ABS, polyacetal, polyacrylics, polycarbonate, thermoplastic polyesters, polyaryletherketones, polyetheretherketones, polyetherketones, polyetherimides, polysulfones, polyethersulfones, polystryenes, SAN copolymers, and copolymers, blends and alloys of said thermoplastics.

11. The method of claim 1 wherein the first thermoplastic and the second thermoplastic are the same material.

12. The method of claim 1 and further wherein the amount of the first and the second polymeric silicone compounded with the thermoplastic in step (a) ranges from about 10 to 60 percent by weight of the total mixture of polymeric silicone and thermoplastic.

13. The method of claim 1 wherein the catalyst is a compound that can initiate a hydrosilylation reaction.

14. The method of claim 13 wherein the catalyst is a platinum complex.

15. The method of claim 13 wherein the catalyst is selected from the group consisting of dichloro-bis (triphenylphosphine)platinum, cis-dichloro-bis(acetonitrile) platinum, dicarbonyldichloroplatinum, platinum chloride, platinum oxide, and platinum-tetramethyl tetravinyl cyclotetrasiloxane complex.

16. The method of claim 14 wherein the platinum complex is platinum-tetramethyl tetravinyl cyclotetrasiloxane complex.

17. The method of claim 1 where in step (b) the catalyst is sprayed on the resultant of step (a).

18. The method of claim 1 where in step (b) from about 0.001 ppm to 1000 ppm molar of catalyst based on the moles of unsaturated groups in the unsaturated silicone component is disposed on the resultant of step (a).

19. The method of claim 1 wherein step (b) further comprises adding an inhibitor to the platinum catalyst.

20. The method of claim 1 wherein the first and the second thermoplastic are selected from the group consisting of liquid crystal polymers.

21. A method for modifying a thermoplastic so that the thermoplastic, as modified, has a higher impact resistance than the thermoplastic in an unmodified state, comprising:
   (a) compounding a thermoplastic with a first polymeric silicone containing silicone-hydride groups and a second polymeric silicone containing unsaturated groups;
   (b) disposing a catalytically effective amount of a hydrosilylation catalyst on the compounded thermoplastic-silicone; and
   (c) forming a thermoplastic-silicone semi-interpenetrating polymer network by compounding the resultant of step (b) with a neat thermoplastic, wherein the hydrosilylation catalyst is activated during compounding.

22. A method of producing an article of manufacture consisting at least in part of a silicone-thermoplastic semi-interpenetrating polymer network, the method comprising the steps of:
   a) compounding a first polymeric silicone containing silicone-hydride groups, a second polymeric silicone containing unsaturated groups, and a first thermoplastic;
   (b) disposing a catalytically effective amount of a hydrosilation catalyst on the resultant of step (a);
   (c) compounding the resultant of step (b) with a second neat thermoplastic while activating the hydrosilation catalyst; and
   (d) converting the product of step (c) into an article of manufacture using plastics processing methods.

23. A method of producing an article of manufacture from a modified thermoplastic, where the modified thermoplastic has a higher impact resistance than the thermoplastic in an unmodified state, the method comprising the steps of:

(a) compounding a thermoplastic with a first polymeric silicone containing silicone-hydride groups and a second polymeric silicone containing unsaturated groups;

(b) disposing a catalytically effective amount of a hydrosilylation catalyst on the compounded thermoplastic-silicone;

(b) disposing a catalytically effective amount of a hydrosilylation catalyst on the compounded thermoplastic-silicone;

(c) forming a thermoplastic-silicone semi-interpenetrating polymer network by compounding the resultant of step (b) with a neat thermoplastic, wherein the hydrosilylation catalyst is activated curing compounding; and (d) converting the product of step (c) into an article of manufacture using plastics processing methods.

* * * * *